US012057249B2

(12) United States Patent
Kim et al.

(10) Patent No.: US 12,057,249 B2

(45) Date of Patent: Aug. 6, 2024

(54) COIL COMPONENT

(71) Applicant: SAMSUNG ELECTRO-MECHANICS CO., LTD., Suwon-si (KR)

(72) Inventors: Hwi Dae Kim, Suwon-si (KR); Dong Hwan Lee, Suwon-si (KR); Sang Soo Park, Suwon-si (KR); Chan Yoon, Suwon-si (KR); Dong Jin Lee, Suwon-si (KR); Hye Mi Yoo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 659 days.

(21) Appl. No.: 16/989,089

(22) Filed: Aug. 10, 2020

(65) Prior Publication Data

US 2021/0366641 A1 Nov. 25, 2021

(30) Foreign Application Priority Data

May 25, 2020 (KR) ........................ 10-2020-0062333

(51) Int. Cl.

| | |
|---|---|
| ***H01F 17/00*** | (2006.01) |
| ***H01F 17/04*** | (2006.01) |
| ***H01F 27/29*** | (2006.01) |
| ***H01F 27/32*** | (2006.01) |

(52) U.S. Cl.

CPC ......... *H01F 17/0013* (2013.01); *H01F 17/04* (2013.01); *H01F 27/292* (2013.01); *H01F 27/324* (2013.01); *H01F 2017/048* (2013.01)

(58) Field of Classification Search

CPC .... H01F 17/0013; H01F 17/04; H01F 27/292; H01F 27/324; H01F 2017/048

See application file for complete search history.

(56) References Cited

U.S. PATENT DOCUMENTS

| | | | | |
|---|---|---|---|---|
| 6,114,936 A * | 9/2000 | Yamamoto | H01F 27/292 | 336/200 |
| 2004/0135652 A1* | 7/2004 | Uchida | H01F 17/0013 | 333/185 |
| 2009/0065594 A1* | 3/2009 | Kato | H01Q 1/50 | 235/492 |

(Continued)

FOREIGN PATENT DOCUMENTS

| | | | |
|---|---|---|---|
| JP | 2005-184343 A | 7/2005 | |
| JP | 2005184343 A * | 7/2005 | H03H 7/0123 |

(Continued)

*Primary Examiner* — Malcolm Barnes

(74) *Attorney, Agent, or Firm* — MORGAN, LEWIS & BOCKIUS LLP

(57) ABSTRACT

A coil component includes a body, a coil portion disposed in the body and having first and second lead-out portions exposed to at least one surface of the body to be spaced apart from each other, first and second external electrodes disposed on the at least one surface of the body to be spaced apart from each other, and respectively connected to the first and second lead-out portions, a dielectric layer disposed on a surface of the body, and a third external electrode disposed on the surface of the body having the dielectric layer disposed thereon to be spaced apart from each of the first and second external electrodes, and covering the dielectric layer.

29 Claims, 12 Drawing Sheets

(56) References Cited

U.S. PATENT DOCUMENTS

| | | | | |
|---|---|---|---|---|
| 2017/0063322 | A1 | 3/2017 | Matsunaga | |
| 2017/0243689 | A1* | 8/2017 | Yoon | H01F 17/04 |
| 2017/0372833 | A1* | 12/2017 | Jang | H01F 17/04 |
| 2018/0268987 | A1* | 9/2018 | Yoon | H01F 27/2804 |
| 2019/0362887 | A1 | 11/2019 | Yang et al. | |
| 2020/0119708 | A1* | 4/2020 | Shiokawa | H01P 5/10 |
| 2020/0321157 | A1* | 10/2020 | Kawai | H01G 4/228 |

FOREIGN PATENT DOCUMENTS

| | | | |
|---|---|---|---|
| KR | 10-2017-0026135 | A | 3/2017 |
| KR | 10-2019-0135165 | A | 12/2019 |

* cited by examiner

COIL COMPONENT

CROSS-REFERENCE TO RELATED APPLICATION(S)

This application claims benefit of priority to Korean Patent Application No. 10-2020-0062333 filed on May 25, 2020 in the Korean Intellectual Property Office, the disclosure of which is incorporated herein by reference in its entirety.

BACKGROUND

1. Field

The present disclosure relates to a coil component.

2. Description of Related Art

An inductor, a coil component, is a typical passive electronic component used in electronic devices, along with a resistor and a capacitor.

As electronic devices gradually become high-performance and smaller, the number of electronic components used in such electronic devices may increase, the electronic components may be miniaturized, and an operating frequency of the electronic components may increase.

For these reasons, there is an increased possibility of problems due to relatively high frequency noise of the coil components.

SUMMARY

An aspect of the present disclosure is to provide a coil component capable of easily removing high frequency noise.

According to an aspect of the present disclosure, a coil component includes a body, a coil portion disposed in the body and having first and second lead-out portions exposed from at least one surface of the body to be spaced apart from each other, first and second external electrodes disposed on the at least one surface of the body to be spaced apart from each other and respectively connected to the first and second lead-out portions, a dielectric layer disposed on a surface of the body, and a third external electrode disposed on the surface of the body having the dielectric layer disposed thereon to be spaced apart from each of the first and second external electrodes and covering the dielectric layer.

According to another aspect of the present disclosure, a coil component includes a body, a coil portion disposed in the body and including a coil having a plurality of turns disposed adjacent to each other on a plane, first and second external electrodes disposed on at least one surface of the body and connected to opposite ends of the coil, an insulating layer disposed on a surface of the body that intersects the plane and having a composition different from the body, and a third external electrode disposed on the insulating layer so as to be free of overlap with the first and second external electrodes.

According to a further aspect of the present disclosure, a coil component includes a body, a coil portion including a coil disposed in the body, first and second external electrodes disposed at least one surface of the body, a dielectric layer disposed on at least another surface of the body and free of contact with the first and second external electrodes, and a third external electrode disposed on the dielectric layer and free of contact with the first and second external electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
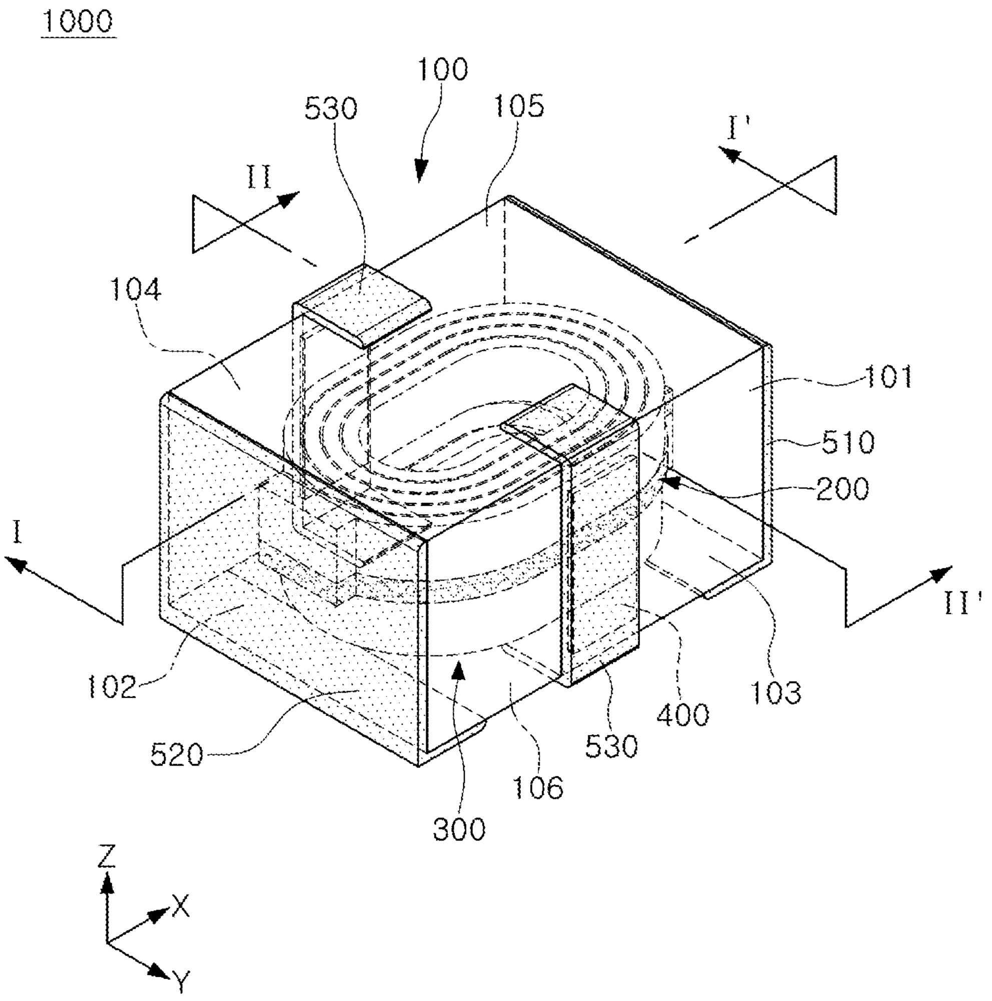
FIG. 1 is a view schematically illustrating a coil component according to a first embodiment of the present disclosure.

The terms used in the description of the present disclosure are used to describe a specific embodiment, and are not intended to limit the present disclosure. A singular term includes a plural form unless otherwise indicated. The terms “include,” “comprise,” “is configured to,” etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms “disposed on,” “positioned on,” and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include configurations in which another element is interposed between the elements such that the elements are also in contact with the other component.

Sizes and thicknesses of elements illustrated in the drawings are indicated as examples for ease of description, and the present disclosure is not limited thereto.

In the drawings, an X direction is a first direction or a length (longitudinal) direction of a body, a Y direction is a second direction or a width direction of the body, a Z direction is a third direction or a thickness direction of the body.

Hereinafter, a coil component according to an embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

First Embodiment & Modified Example

Figure 2:
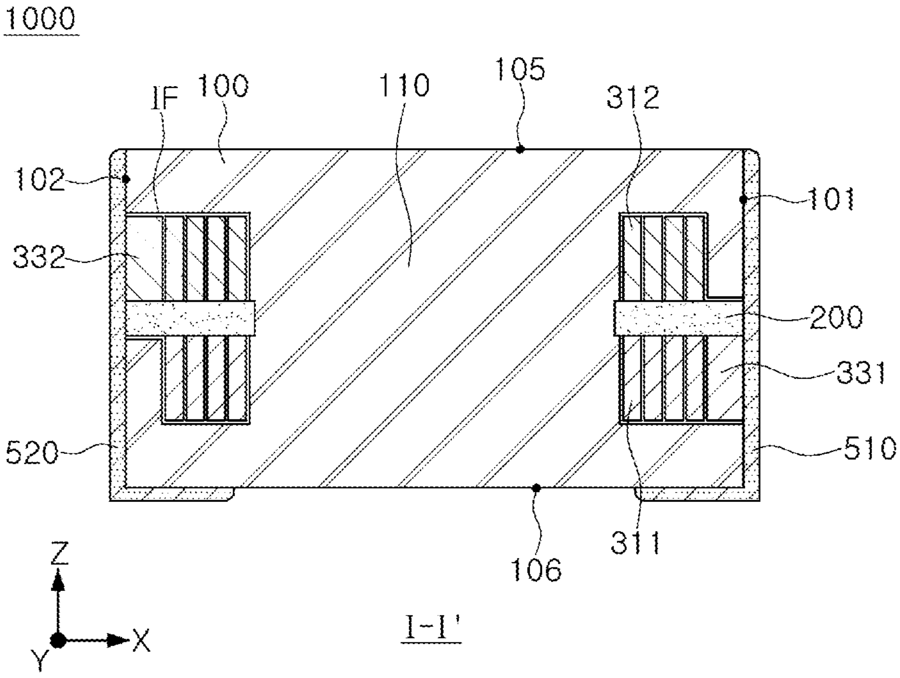
FIG. 2 is a view illustrating a cross-section taken along line I-I' of FIG. 1.
Figure 3:
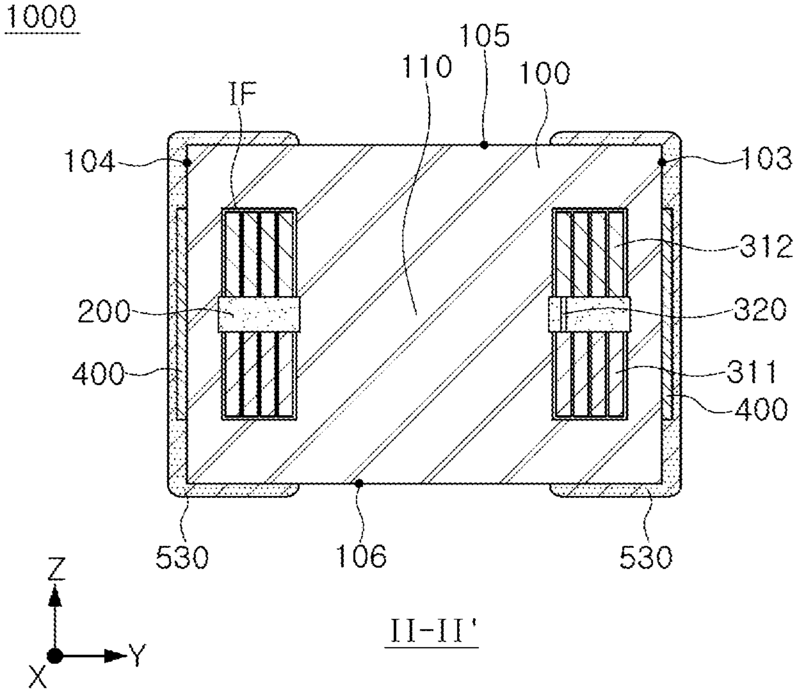
FIG. 3 is a view illustrating a cross-section taken along line II-II' of FIG. 1.
Figure 4:
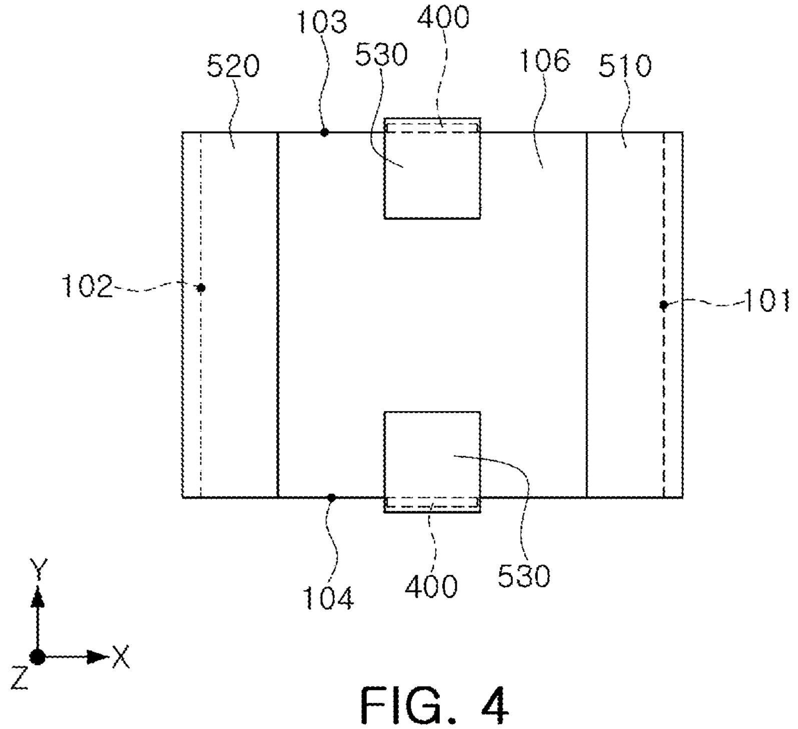
FIG. 4 is a view schematically illustrating a coil component according to a first embodiment of the present disclosure, when viewed from a lower side of FIG. 1.

FIG. 1 is a view schematically illustrating a coil component according to a first embodiment of the present disclosure. FIG. 2 is a view illustrating a cross-section taken along line I-I' of FIG. 1. FIG. 3 is a view illustrating a cross-section taken along line II-II' of FIG. 1. FIG. 4 is a view schematically illustrating a coil component according to a first embodiment of the present disclosure, when viewed from a lower portion of FIG. 1.

Referring to FIGS. 1 to 4, a coil component 1000 according to a first embodiment of the present disclosure may include a body 100, a support substrate 200, a coil portion 300, a dielectric layer 400, and first to third external electrodes 510, 520, and 530.

The body 100 may form an exterior of the coil component 1000 according to this embodiment, and the coil portion 300 may be embedded therein.

The body 100 may be formed to have a hexahedral shape overall.

Referring to FIG. 1, the body 100 may include a first surface 101 and a second surface 102 opposing each other in a length direction X of the body 100, a third surface 103 and a fourth surface 104 opposing each other in a width direction Y of the body 100, and a fifth surface 105 and a sixth surface 106 opposing each other in a thickness direction Z of the body 100. Each of the first to fourth surfaces 101, 102, 103, and 104 of the body 100 may correspond to wall surfaces of the body 100 connecting the fifth surface 105 and the sixth surface 106 of the body 100. Hereinafter, both/opposing end surfaces of the body 100 may refer to the first surface 101 and the second surface 102 of the body 100, and both/opposing side surfaces of the body 100 may refer to the third surface 103 and the fourth surface 104 of the body 100. In addition, one surface and an/the other surface of the body 100 may refer to the sixth surface 106 and the fifth surface 105 of the body 100, respectively.

The body 100 may, for example, be formed such that the coil component 1000 according to this embodiment in which the first to third external electrodes 410, 420, and 430 to be described later are formed has a length of 2.0 mm, a width of 1.2 mm, and a thickness of 0.65 mm, but is not limited thereto. Since the above-described numerical values are only illustrative design values that do not reflect process errors and the like, it should be considered that components with sizes differing therefrom may nonetheless fall within the scope of the present disclosure, to the extent that the differences fall within the range of process errors. Note that the disclosure also encompasses components having dimensions different from those discussed above.

The length, the width, and the thickness of the coil components 1000 described above may be measured by a micrometer measurement method. The micrometer measurement method may be carried out by setting a zero point with a micrometer (apparatus) having a Gage R&R technique (i.e., a gage repeatability and reproducibility technique), inserting the coil component 1000 between tips of the micrometer, and turning a measuring lever of the micrometer. In measuring the length of the coil component 1000 by the micrometer measurement method, the length of the coil component 1000 may refer to a value measured once, or may refer to an arithmetic mean of multiple values measured at different times or locations. This may be equally applied to the width and the thickness of the coil component 1000.

The length, the width, and the thickness of the coil component 1000 described above may be measured by a cross-section analysis method. As an example, a method for measuring the length of the coil component 1000 by the cross-section analysis method will be described. Based on an image of a cross-section through a central portion of the body 100 in the width direction Y, the cross-section extending in the longitudinal direction X and thickness direction Z, captured by an optical microscope or a scanning electron microscope (SEM), the length of the coil component 1000 may refer to a maximum value among lengths of a plurality of line segments, connecting outermost boundary lines of the coil component 1000, and parallel to the longitudinal direction X of the body 100, as shown in the captured image. Alternatively, the length of the coil component 1000 may refer to a minimum value among lengths of a plurality of line segments, connecting outermost boundary lines of the coil component 1000, and parallel to the longitudinal direction X of the body 100, as shown in the captured image. Alternatively, the length of the coil component 1000 may refer to an arithmetic mean value of at least three or more lengths of a plurality of line segments, connecting outermost boundary lines of the coil component 1000, and parallel to the longitudinal direction X of the body 100, as shown in the captured image. This measurement methodology may be equally applied to the width and the thickness of the coil component 1000.

The body 100 may include a magnetic material and a resin. Specifically, the body 100 may be formed by stacking one or more magnetic composite sheets including a resin and a magnetic material dispersed in the resin. The body 100 may have a structure, other than a structure in which the magnetic material may be dispersed in the resin. For example, the body 100 may be made of a magnetic material such as ferrite.

The magnetic material may be a ferrite powder particle or a metal magnetic powder particle.

Example of the ferrite powder particle may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the metal magnetic powder particle may be a Fe—Si—B—Cr-based amorphous alloy powder particle, but is not limited thereto.

The ferrite powder particle and the magnetic powder particle may each have an average diameter of about 0.1 μm to 30 μm, but are not limited thereto. In this case, the average diameter may refer to a particle size distribution represented by D50 or D90.

The body 100 may include two or more types of magnetic materials dispersed in resin. In this case, the term "different types of magnetic materials" means that the magnetic materials dispersed in the resin are distinguished from each other by average diameter, composition, crystallinity, and shape.

The resin may include an epoxy, a polyimide, a liquid crystal polymer, or the like, in a single form or in combined forms, but is not limited thereto.

The body 100 may include a core 110 passing through a central portion of each of the support substrate 200 and the coil portion 300, which will be described later. The core 110 may be formed by filling a through-hole of the coil portion 300 with a magnetic composite sheet, but is not limited thereto.

The support substrate 200 may be embedded in the body 100. The support substrate 200 may support the coil portion 300 to be described later.

The support substrate 200 may be formed of an insulating material including a thermosetting insulating resin such as an epoxy resin, a thermoplastic insulating resin such as polyimide, or a photosensitive insulating resin, or may be formed of an insulating material in which a reinforcing material such as a glass fiber or an inorganic filler is impregnated with an insulating resin. For example, the support substrate 200 may be formed of a material such as prepreg, Ajinomoto Build-up Film (ABF), FR-4, a Bismaleimide Triazine (BT) resin, a photoimageable dielectric (PID), a copper clad laminate (CCL), and the like, but are not limited thereto.

As the inorganic filler, at least one or more selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of an insulating material including a reinforcing material, the support substrate 200 may provide better rigidity. When the support substrate 200 is formed of an insulating material not containing glass fibers, the support substrate 200 may be advantageous for reducing a thickness of the overall coil portion 300. When the support substrate 200 is formed of an insulating material containing a photosensitive insulating resin, the number of process steps for forming the coil portion 300 may be reduced. Therefore, it may be advantageous in reducing production costs, and a fine via may be formed.

The coil portion 300 may be embedded in the body 100, and may manifest characteristics of the coil component. For example, when the coil component 1000 of this embodiment is used as a power inductor, the coil portion 300 may function to stabilize the power supply of an electronic device by storing electric energy as a magnetic field and maintaining an output voltage.

The coil portion 300 may be disposed in the body 100, and first and second lead-out portions 331 and 332 may be exposed from a surface of the body 100 to be spaced apart from each other. Specifically, the coil portion 300 applied to this embodiment may include first and second coil patterns 311 and 312 formed on opposite surfaces of the support substrate 200 opposing each other in the thickness direction Z of the body 100, a via 320 passing through the support substrate 200 to connect the first and second coil patterns 311 and 312 to each other, and first and second lead-out portions 331 and 332 respectively connected to the first and second coil patterns 311 and 312 and respectively exposed from the first and second surfaces 101 and 102 of the body 100.

Each of the first coil pattern 311 and the second coil pattern 312 may be in the form of a planar spiral shape having at least one turn formed about the core 110. For example, based on the directions of FIGS. 2 and 3, the first coil pattern 311 may form at least one turn around the core 110 on a lower surface of the support substrate 200, and the second coil pattern 312 may format least one turnaround the core 110 on an upper surface of the support substrate 200.

The first and second lead-out portions 331 and 332 may respectively connect the first and second coil patterns 331 and 332 and the first and second external electrodes 510 and 520 to be described later. For example, the first lead-out portion 331 may extend from the first coil pattern 311 to be exposed from the first surface 101 of the body 100, and the second lead-out portion 332 may extend from the second coil pattern 312 to be exposed from the second surface 102 of the body 100. As will be described later, since the first and second external electrodes 510 and 520 may be formed on the first and second surfaces 101 and 102 of the body 100, respectively, the first lead-out portion 331 may be in contact with and connected to the first external electrode 510, and the second lead-out portion 332 may be in contact with and connected to the second external electrode 520.

The coil patterns 311 and 312 and the lead-out portions 331 and 332 may be integrally formed with each other such that a boundary may be not formed therebetween. For example, the first coil pattern 311 and the first lead-out portion 331 may be simultaneously formed through the same process, such that a boundary may not be formed in a vertical direction. The scope of this embodiment is not limited thereto.

At least one of the coil patterns 311 and 312, the via 320, and the lead-out portions 331 and 332 may include at least one conductive layer. For example, when the second coil pattern 312, the via 320, and the second lead-out portion 332 are formed by plating on the other surface of the support substrate 200, the second coil pattern 312, the via 320, and the second lead-out portion 332 may include a seed layer and an electroplating layer. The seed layer may be formed by a vapor deposition method such as electroless plating, sputtering, or the like. Each of the seed layer and the electroplating layer may have a single-layer structure or a multilayer structure. The electroplating layer of the multilayer structure may be formed by a conformal film structure in which one electroplating layer is covered by the other electroplating layer, or may have a form in which the other electroplating layer is stacked on only one surface of the one electroplating layer. The seed layer of the second coil pattern 312, the seed layer of the via 320, and the seed layer of the second lead-out portion 332 may be integrally formed with each other, such that no boundary therebetween may occur, but are not limited thereto. The electroplating layer of the second coil pattern 312, the electroplating layer of the via 320, and the electroplating layer of the second lead-out portion 332 may be integrally formed with each other, such that no boundary therebetween may occur, but are not limited thereto.

The coil patterns 311 and 312 and the lead-out portions 331 and 332 may be formed to protrude from the lower surface and the upper surface of the support substrate 200, respectively, based on the directions of FIGS. 2 and 3. As another example, based on the directions of FIGS. 2 and 3, the first coil pattern 311 and the first lead-out portion 331 may be formed to protrude from the lower surface of the support substrate 200, and the second coil pattern 312 and the second lead-out portion 332 may be formed to be embedded in the support substrate 200, but may have an upper surface protruding from the upper surface of the support substrate 200. In this case, a recess may be formed in the upper surface of the second coil pattern 312 and the second lead-out portion 332, such that the upper surface of the support substrate 200 and the upper surfaces of the second coil pattern 312 and the second lead-out portion 332 may not be located on the same plane. As another example, based on the directions of FIGS. 2 and 3, the second coil pattern 312 and the second lead-out portion 332 may be formed to protrude from the upper surface of the support substrate 200, and the first coil pattern 311 and the first lead-out portion 331 may be formed to be embedded in the lower surface of the support substrate 200, but may have a lower surface protruding from the lower surface of the support substrate 200. In this case, a recess may be formed in the lower surface of the first coil pattern 311 and the first lead-out portion 331, such that the lower surface of the support substrate 200 and the lower surface of the first coil pattern 311 and the first lead-out portion 331 may not be located on the same plane. As another example, based on the directions of FIGS. 2 and 3, when the first coil pattern 311 and the first lead-out portion 331 disposed on the lower surface side of the support substrate 200 and the second coil pattern 312 and the second lead-out portion 332 disposed on the upper surface side of the support substrate 200 are formed separately, and then collectively stacked on the support substrate 200 to form the coil portion 300, the via 320 may include a high-melting-point metal layer, and a low-melting-point metal layer having a melting point lower than a melting point of the high-melting-point metal layer. In this case, the low-melting-point metal layer may be formed of a solder containing lead (Pb) and/or tin (Sn). At least a portion of the low-melting-point metal layer may be melted due to pressure and temperature during batch stacking. For this reason, an intermetallic compound layer (IMC layer) may be formed on at least a portion of a boundary between the low-melting-point metal layer and the second coil pattern 312 and a boundary between the low-melting-metal layer and the high-melting-point metal layer.

Each of the coil patterns 311 and 312, the via 320, and lead-out portions 331 and 332 may be formed of a conductive material such as copper (Cu), aluminum (Al), silver (Ag), tin (Sn), gold (Au), nickel (Ni), lead (Pb), titanium (Ti), chromium (Cr), or alloys thereof, but is not limited thereto.

An insulating film IF may be disposed between each of the coil patterns 311 and 312 and the lead-out portions 331 and 332 and the body 100. For example, referring to FIGS. 2 and 3, the insulating film IF may be formed as a conformal film along the surfaces of the coil patterns 311 and 312, the lead-out portions 331 and 332, and the support substrate 200. The insulating film IF may protect each of the coil patterns 311 and 312 and the lead-out portions 331 and 332, may insulate the coil portion 300 from the body 100, and may include a known insulating material such as parylene, or the like. Any insulating material included in the insulating film IF may be used, and there is no particular limitation. The insulating film IF may be formed by vapor deposition or the like, but is not limited thereto, and may be formed by stacking an insulating material such as Ajinomoto Build-up Film (ABF) or the like on the support substrate 200.

The dielectric layer 400 may be disposed on a surface of the body 100. Specifically, the dielectric layer 400 may be disposed between a surface of the body 100 on which the third external electrode 530 to be described later is disposed, and the third external electrode 530. The dielectric layer 400 may be configured to be disposed in an overlapping region (e.g., overlapping in the Y direction) between the third external electrode 530 and the coil portion 300 such that capacitive-coupling is formed between the third external electrode 530 and the coil portion 300. In this embodiment, the dielectric layers 400 may be formed as a plurality of dielectric layers spaced apart from each other, and the plurality of dielectric layers may be disposed on the third and fourth surfaces 103 and 104 of the body 100, respectively.

The dielectric layer 400 may be formed of a ferroelectric material such as barium titanate ($BaTiO_3$) having a relatively high dielectric constant ($\varepsilon=\varepsilon 0\varepsilon r$), may be formed of a composite material in which an inorganic filler is dispersed in an insulating resin, or may be formed of a composite material composed of an insulating resin. In this case, the inorganic filler may be a ferroelectric powder particle such as barium titanate, but is not limited thereto.

The dielectric layer 400 may be formed on a surface of the body 100 by a film lamination method using a material for forming a dielectric layer in the form of a film, or may be formed by printing or spray coating a material for forming a dielectric layer in the form of a paste on a surface of the body 100, but is not limited thereto.

The first and second external electrodes 510 and 520 may be respectively connected to the first and second lead-out portions 331 and 332 of the coil portion 300. In this embodiment, the first external electrode 510 may be disposed on the first surface 101 of the body 100, to be in contact with and connected to the first lead-out portion 331 of the coil portion 300 exposed from the first surface 101 of the body 100, and to extend to a portion of the sixth surface 106 of the body 100. The second external electrode 520 may be disposed on the second surface 102 of the body 100, to be in contact with and connected to the second lead-out portion 332 of the coil portion 300 exposed from the second surface 102 of the body 100, and to extend to a portion of the sixth surface 106 of the body 100. On the sixth surface 106 of the body 100, the first and second external electrodes 510 and 520 may be disposed to be spaced apart from each other.

The third external electrode 530 may be disposed on a surface of the body 100, to be spaced apart from the first and second external electrodes 510 and 520, and may cover the dielectric layer 400. The third external electrode 530 may be connected to a ground of a mounting substrate, when the coil component 1000 according to this embodiment is mounted on the mounting substrate or the like, or may be connected to a ground of an electronic component package, when the coil component 1000 according to this embodiment is packaged in the electronic component package. The third external electrode 530 may be a ground electrode of the coil component 1000 according to this embodiment. In this embodiment, the third external electrode 530 may be provided as a plurality of third external electrodes, spaced apart from each other, to be respectively formed on the third and fourth surfaces 103 and 104 of the body 100, to cover the dielectric layers 400 respectively disposed on the third and fourth surfaces 103 and 104 of the body 100. In addition, each of the plurality of third external electrodes 530 may extend to the sixth surface 106 of the body 100, and may be disposed on the sixth surface 106 of the body to be spaced apart from each other. The third external electrode 530 may cover the dielectric layer 400 and extend over an edge of the dielectric layer 400 to contact a surface of the body 100.

Each of the first to third external electrodes 510, 520, and 530 may include at least one of a conductive resin layer and an electrolytic plating layer. The conductive resin layer may be formed by printing a conductive paste on a surface of the body 100 and curing the printed conductive paste, and may include any one or more conductive metals selected from the group consisting of copper (Cu), nickel (Ni), and silver (Ag), and a thermosetting resin. The electrolytic plating layer may include anyone or more selected from the group consisting of nickel (Ni), copper (Cu), and tin (Sn).

The third external electrode 530 may be capacitive-coupled to the coil portion 300 by the dielectric layer 400. Specifically, since the third external electrode 530 forms an overlapping region with the coil portion 300, and the dielectric layer 400 is disposed between the third external electrode 530 and the coil portion 300, the third external electrode 530 and the coil portion 300 may form capacitance. In this embodiment, the dielectric layer 400 and the third external electrode 530 may be formed on a surface of the body 100, to remove high frequency noise in a relatively simple manner. In addition, in this embodiment, since the dielectric layer 400 and the third external electrode 530 may be formed on the third and fourth surfaces 103 and 104 of the body 100 having a relatively short distance from a surface of the body 100 to the coil portion 300, capacitive-coupling between the third external electrode 530 and the coil portion 300 may be further enhanced. In this case, the term "high frequency noise" may refer to a signal having a frequency exceeding an upper limit of a frequency range set as an operating frequency, when designing the coil component 1000 according to this embodiment. As a non-limiting example, in this embodiment, high frequency noise may refer to a signal of 600 MHz or more.

A measurement of the dielectric layer 400 in the thickness direction Z of the body 100 may be equal to or greater than a measurement from a lower surface of the first coil pattern 311 to an upper surface of the second coil pattern 312. In addition, the dielectric layer 400 may be disposed on the third and fourth surfaces 103 and 104 of the body 100, respectively, to cover the overlapping region between the coil portion 300 and the third external electrode 530. For this reason, the dielectric layer 400 may be disposed in the overlapping region between the coil portion 300 and the third external electrode 530 to further enhance capacitive-coupling between the coil portion 300 and the third external electrode 530.

Figure 5:
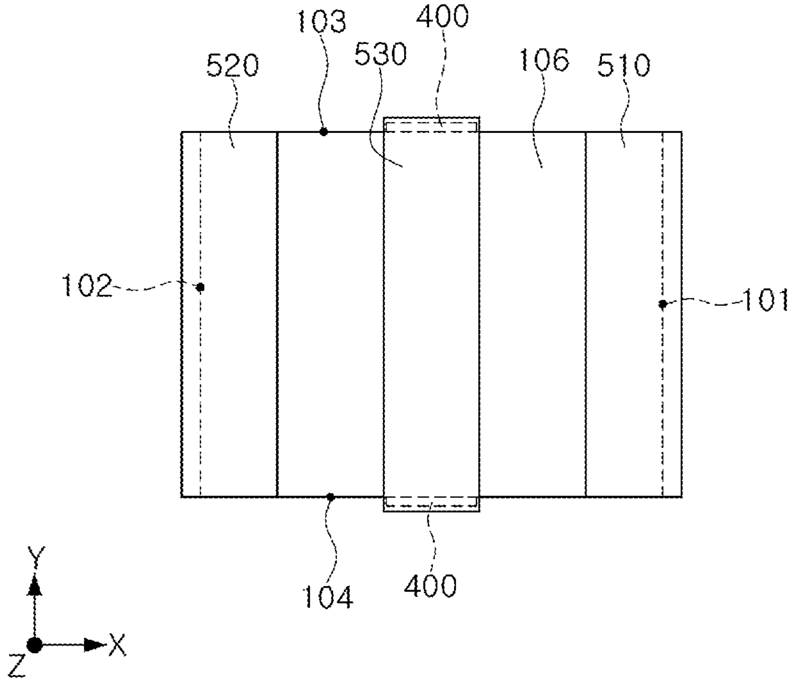
FIG. 5 is a view schematically illustrating a first modified example of a first embodiment of the present disclosure, when viewed from a lower side of FIG. 1.

FIG. 5 is a view schematically illustrating a first modified example of a first embodiment of the present disclosure, in a view corresponding to FIG. 4.

Referring to FIG. 5, in the first modified example, dielectric layers 400 may be disposed on each of the third and fourth surfaces 103 and 104 of the body 100, and may be spaced apart from each other, and the third external electrode 530 may be integrally formed on the third, fourth, and sixth surfaces 103, 104, and 106 of the body 100. Therefore, the third external electrode 530 may be formed to extend from the sixth surface 106 of the body 100 to both ends of the width direction Y of the body 100. In this case, the third external electrode 530 may be easily formed by a printing method, to improve bonding reliability with the mounting substrate.

Figure 6:
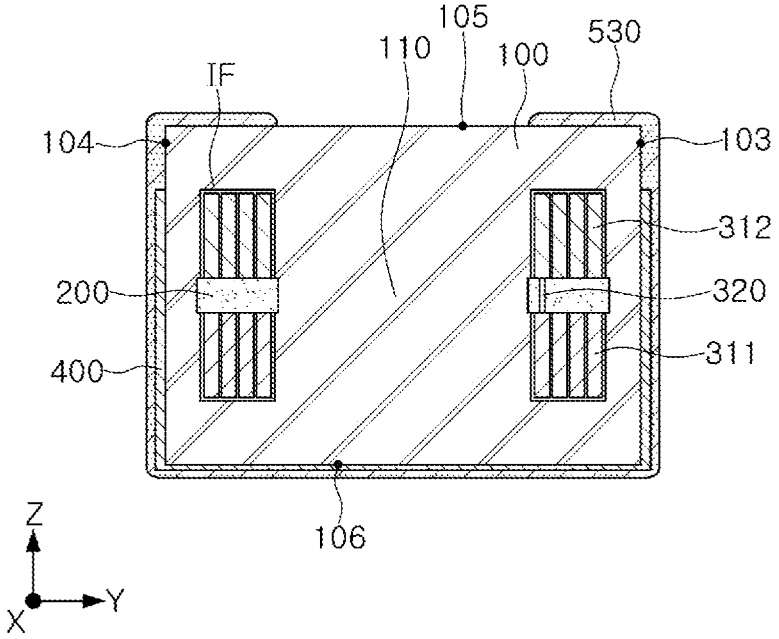
FIGS. 6 and 7 are views schematically illustrating a second modified example of a first embodiment of the present disclosure, and respectively showing views corresponding to views of FIGS. 3 and 4.
Figure 7:
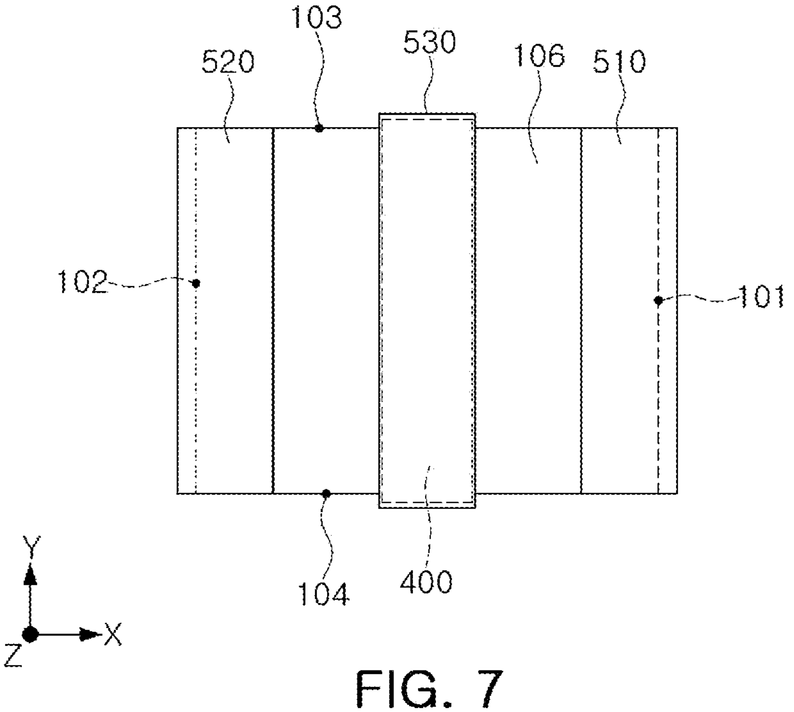

FIGS. 6 and 7 are views schematically illustrating a second modified example of a first embodiment of the present disclosure, and respectively corresponding to views shown in FIGS. 3 and 4.

Referring to FIGS. 6 and 7, in a case of the second modified example, each of the dielectric layer 400 and the third external electrode 530 may be formed in a singular form integrally formed on the third, fourth, and sixth surfaces 103, 104, and 106 of the body 100. In this case, each of the dielectric layer 400 and the third external electrode 530 may be easily formed by a printing method, and capacitive-coupling between the coil portion 300 and the third external electrode 530 may be also formed on the sixth surface 106 of the body 100.

In the above, it has been described on the assumption that each of the first and second external electrodes 510 and 520 is L-shaped, but the scope of this embodiment is not limited thereto. For example, shapes of the first and second external electrodes 510 and 520 are not limited as long as they are disposed on the sixth surface 106 of the body 100 to be spaced apart from each other and from the third external electrode 530. For example, the first external electrode 510 may be modified to have a form disposed only on the sixth surface 106 of the body 100, a form disposed on the first surface 101 of the body 100 to extend to at least a portion of each of the fifth and sixth surfaces 105 and 106 of the body 100, or a form disposed on the first surface 101 of the body 100 to extend to at least a portion of each of the third to sixth surfaces 103, 104, 105, and 106 of the body 100.

Second Embodiment

Figure 8:
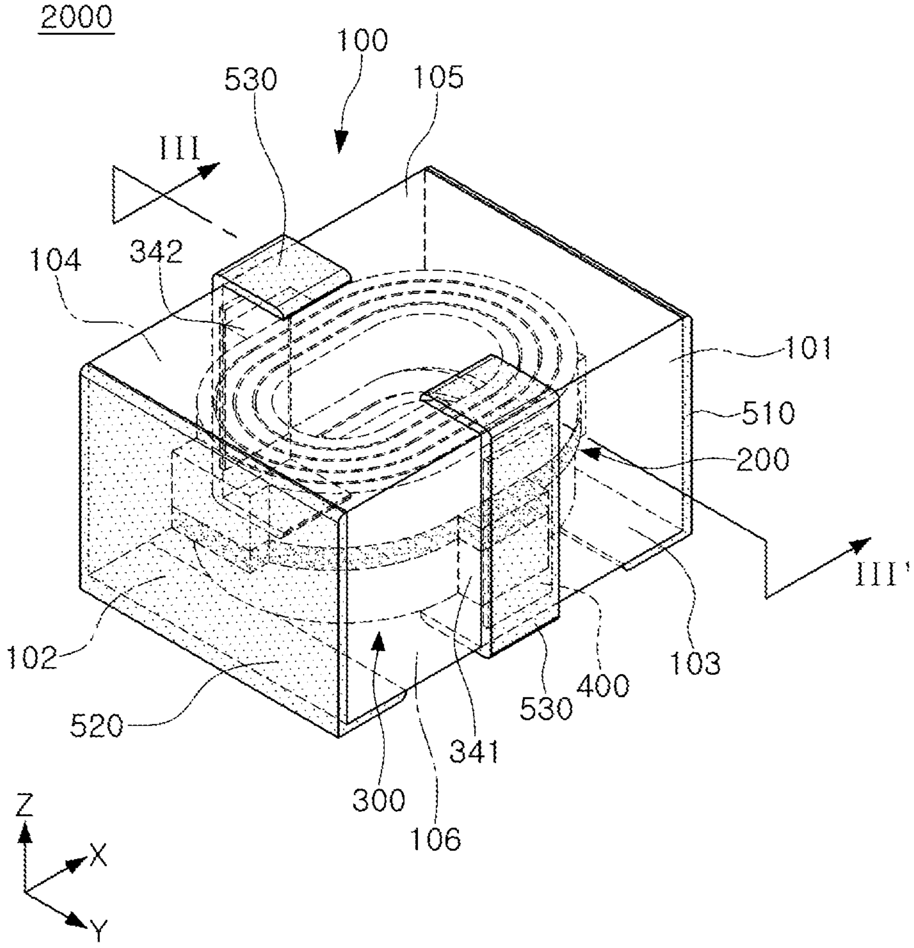
FIG. 8 is a view schematically illustrating a coil component according to a second embodiment of the present disclosure.
Figure 9:
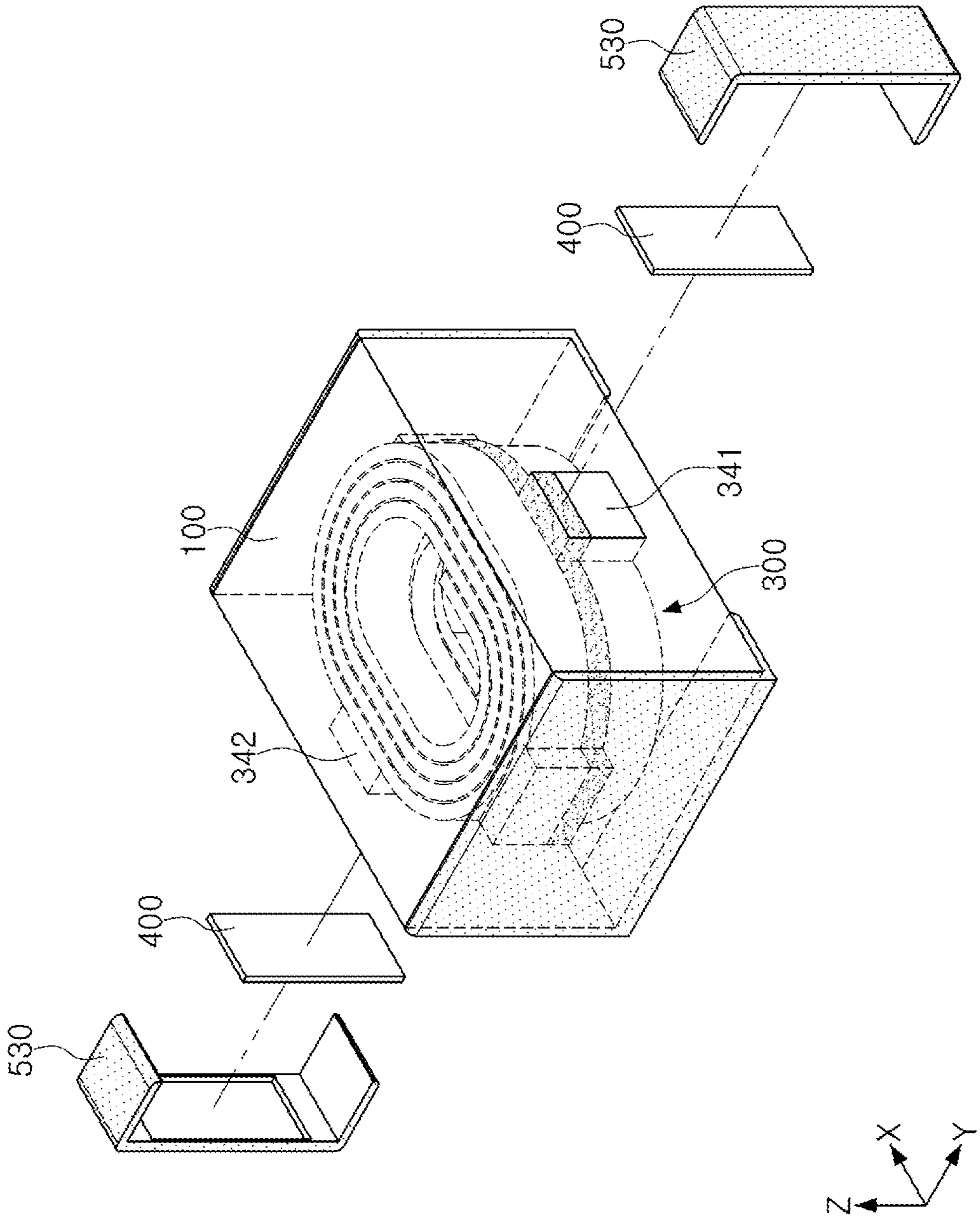
FIG. 9 is a view illustrating an exploded portion of a coil component according to the second embodiment of the present disclosure.
Figure 10:
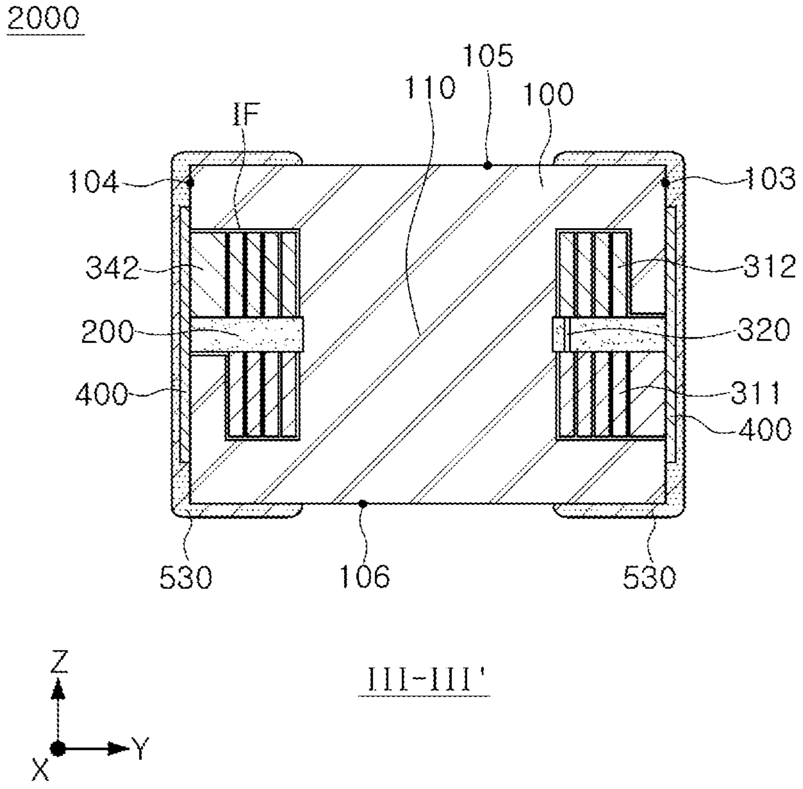
FIG. 10 is a view illustrating a cross-section taken along line III-III' of FIG. 8.

FIG. 8 is a view schematically illustrating a coil component according to a second embodiment of the present disclosure. FIG. 9 is a view illustrating an exploded portion of a coil component according to the second embodiment of the present disclosure. FIG. 10 is a view illustrating a cross-section taken along line of FIG. 8.

Referring to FIGS. 1 to 4 and FIGS. 8 to 10, when a coil component 2000 according to this embodiment is compared to the coil component 1000 according to the first embodiment of the present disclosure, a coil portion 300 may be differently provided. Therefore, in describing this embodiment, only the coil portion 300, different from the first embodiment of the present disclosure, will be described. The remainder of the configuration of this embodiment may be applied as described in the first embodiment of the present disclosure.

Referring to FIGS. 8 to 10, the coil portion 300 applied to the coil component 2000 according to this embodiment may further include feed portions 341 and 342 exposed through a surface of the body 100 to be spaced apart from the first and second lead-out portions 331 and 332. Specifically, a first feed portion 341 may be connected to the first coil pattern 311, may be spaced apart from the first lead-out portion 331, and may be exposed through the third surface 103 of the body 100. A second feed portion 342 may be connected to the second coil pattern 312, may be spaced apart from the second lead-out portion 332, and may be exposed through the fourth surface 104 of the body 100. The dielectric layers 400 may be respectively disposed on exposed surfaces of the feed portions 341 and 342 to cover the exposed surfaces of the feed portions 341 and 342.

The feed portions 341 and 342 and the coil patterns 311 and 312 may be formed together in the same process to form integrally with each other without forming a boundary, but the scope of this embodiment is not limited thereto.

In this embodiment, the feed portions 341 and 342 of the coil portion 300 may be formed to have an extended form from the coil patterns 311 and 312 to be exposed through the third and fourth surfaces 103 and 104 of the body 100, respectively. Due to this, a distance between the coil portion 300 and the third external electrode 530 may be reduced. Therefore, capacitive-coupling between the coil portion 300 and the third external electrode 530 may be enhanced, and capacitance formed by the coil portion 300 and the third external electrode 530 and the dielectric layer 400 may be improved. As a result, an effect of this embodiment for removing high frequency noise may be improved.

Although not described in this embodiment, modified examples described in the first embodiment of the present disclosure may be applied to the coil component 2000 according to this embodiment.

Third Embodiment

Figure 11:
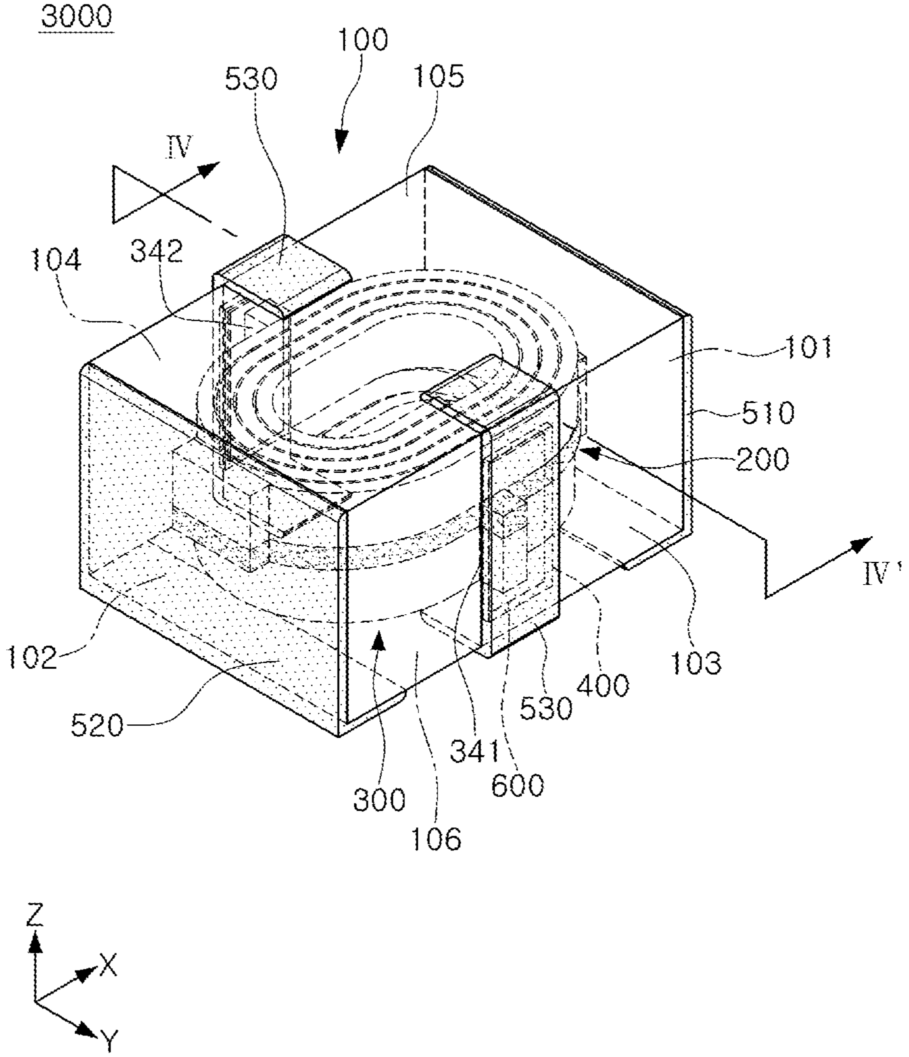
FIG. 11 is a view schematically illustrating a coil component according to a third embodiment of the present disclosure.
Figure 12:
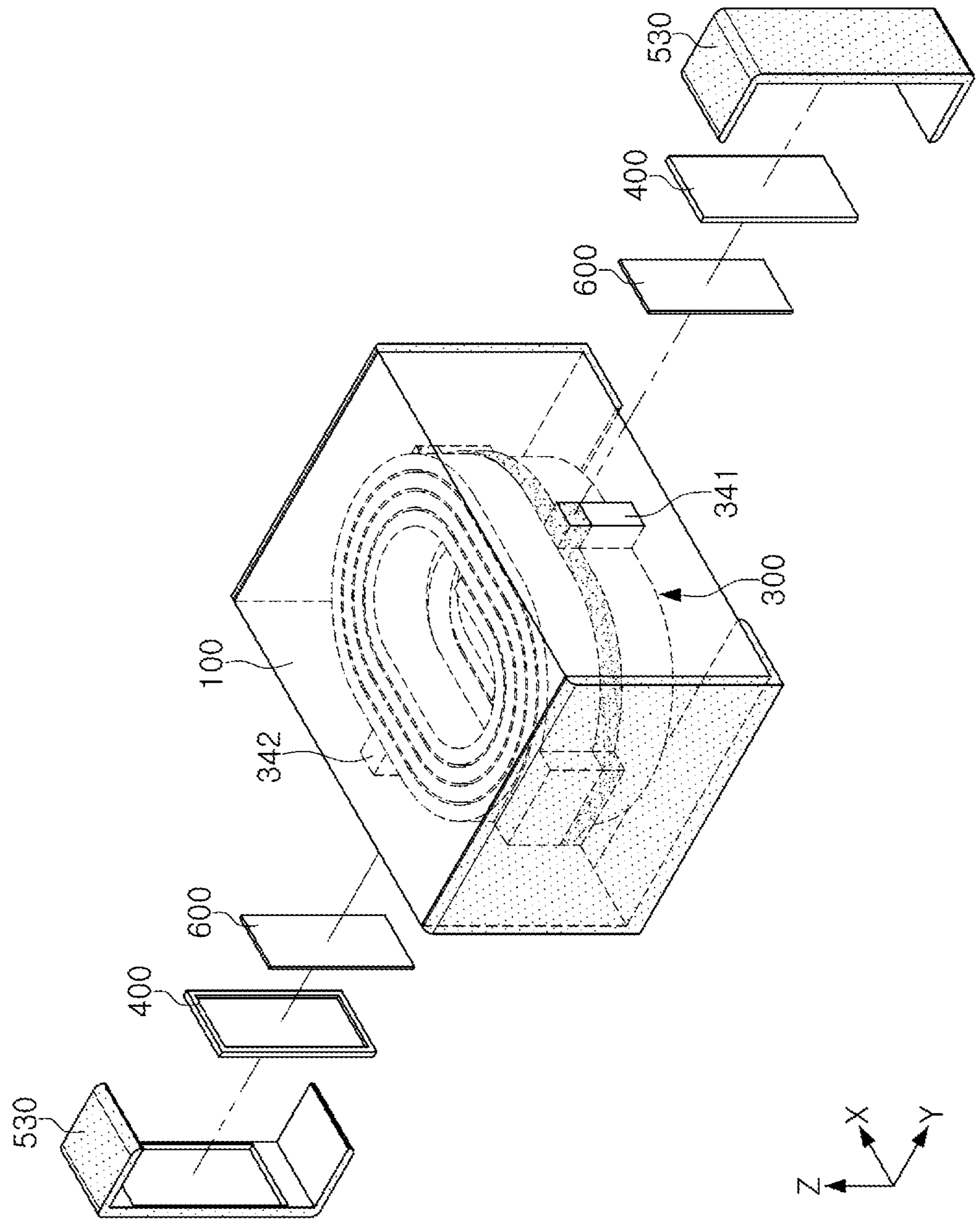
FIG. 12 is a view illustrating an exploded portion of a coil component according to the third embodiment of the present disclosure.
Figure 13:
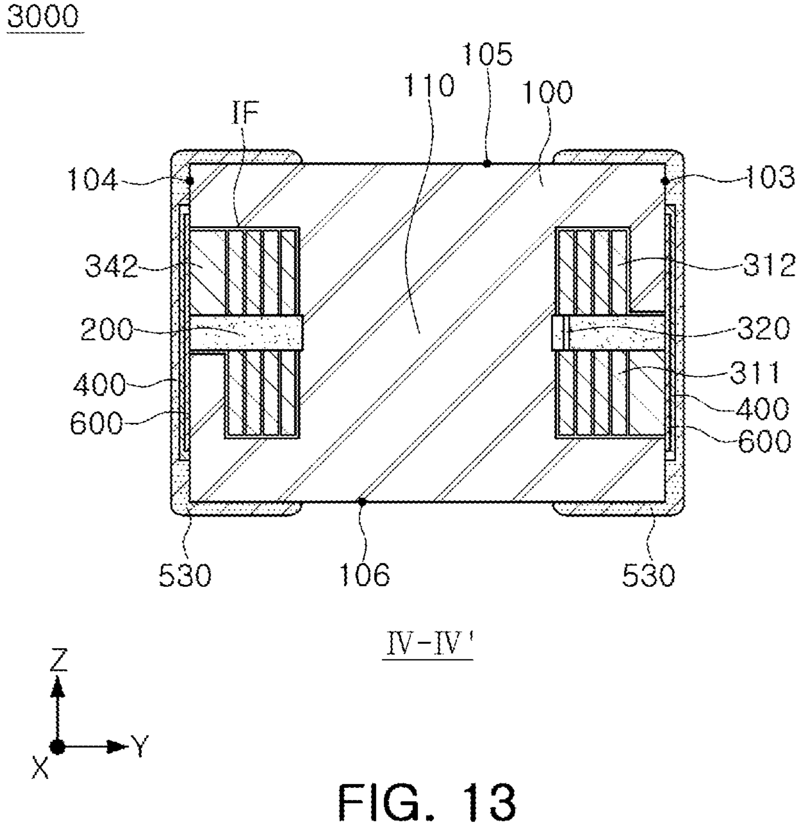
FIG. 13 is a view illustrating a cross-section taken along line IV-IV' of FIG. 11.

FIG. 11 is a view schematically illustrating a coil component according to a third embodiment of the present disclosure. FIG. 12 is a view illustrating an exploded portion of a coil component according to a third embodiment of the present disclosure. FIG. 13 is a view illustrating a cross-section taken along line IV-IV' of FIG. 11.

Referring to FIGS. 8 to 10, and FIGS. 11 to 13, when a coil component 3000 according to this embodiment is compared to the coil component 2000 according to the second embodiment of the present disclosure, feed portions 341 and 342, and a conductor film 600 may be differently provided. Therefore, in describing this embodiment, only the feed portions 341 and 342 and the conductor film 600, different from the second embodiment of the present disclosure, will be described. The remainder of the configuration of this embodiment may be applied as described in the second embodiment of the present disclosure.

Referring to FIGS. 11 to 13, a coil component 3000 according to this embodiment may be disposed between the third and fourth surfaces 103 and 104 of the body 100 and the dielectric layer 400, and may further include a conductive film 600 respectively covering exposed surfaces of feed portions 341 and 342. The conductive film 600 may be in contact with and connected to the feed portions 341 and 342, respectively.

The conductor film 600 may be formed of a conductive material such as copper (Cu), aluminum (Al), silver (Ag), tin (Sn), gold (Au), nickel (Ni), lead (Pb), titanium (Ti), chromium (Cr), or alloys thereof, but is not limited thereto.

The dielectric layer 400 may cover the conductor film 600.

Since the dielectric layer 400 covers the conductor film 600, short-circuit between the conductor film 600 and the third external electrode 530 may be prevented.

Since the conductor film 600 is connected to the coil portion 300, volumes of the feed portions 341 and 342 disposed in the body 100 may be reduced. Due to this, a proportion of a magnetic body in the body 100 may be relatively improved. In addition, since the conductor film 600 is disposed on a surface of the body 100, an overlapping region thereof formed in relation to the third external electrode 530 may be easily controlled.

Although not described in this embodiment, modified examples described in the first embodiment of the present disclosure may be applied to the coil component 3000 according to this embodiment.

Fourth Embodiment

Figure 14:
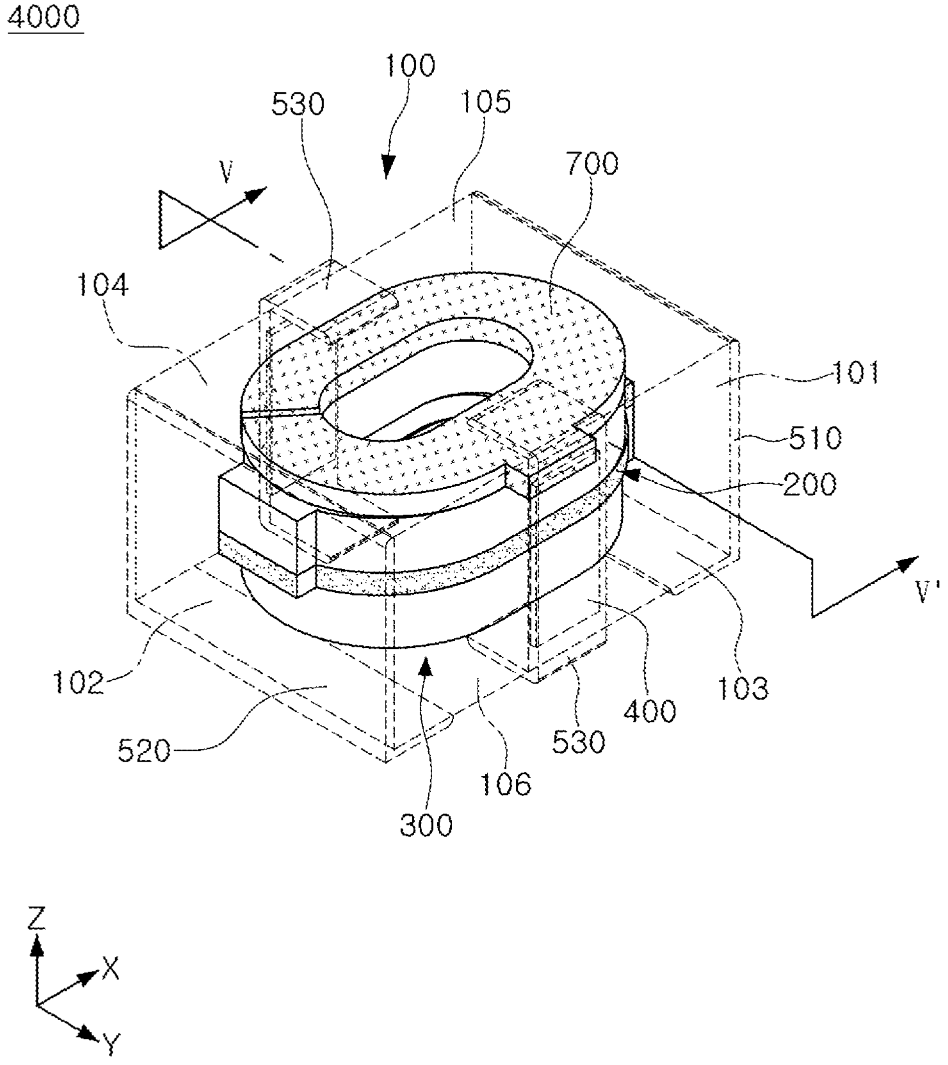
FIG. 14 is a view schematically illustrating a coil component according to a fourth embodiment of the present disclosure.
Figure 15:
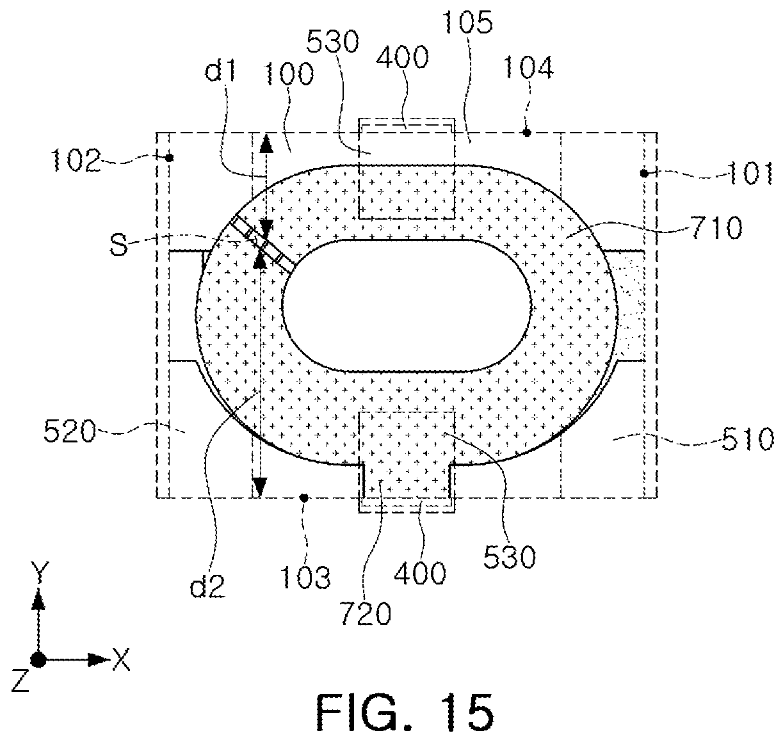
FIG. 15 is a view schematically illustrating the coil component illustrated in FIG. 14, when viewed from above.
Figure 16:
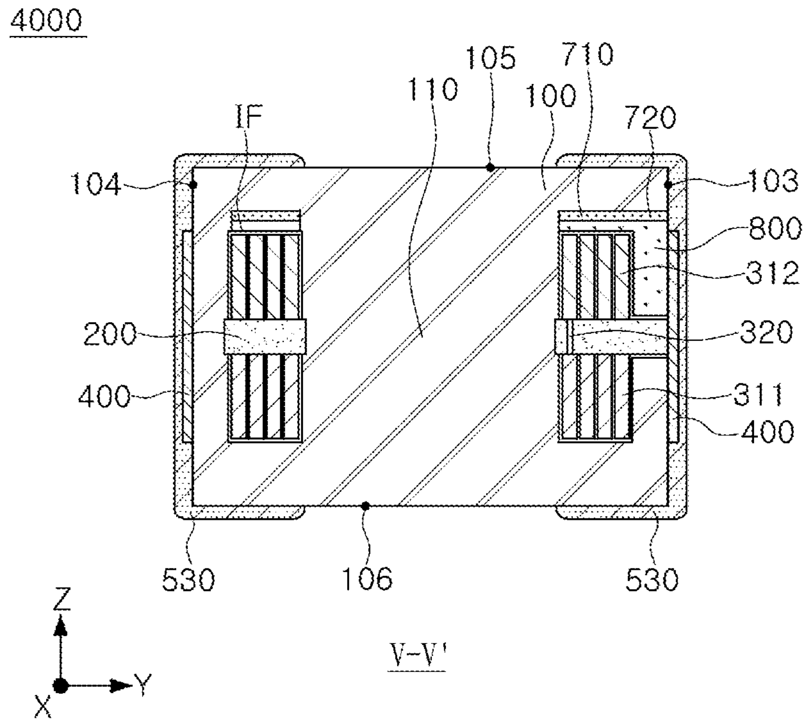
FIG. 16 is a view illustrating a cross-section taken along line V-V' of FIG. 13.

FIG. 14 is a view schematically illustrating a coil component according to a fourth embodiment of the present disclosure. FIG. 15 is a view schematically illustrating the coil component illustrated in FIG. 14, when viewed from above. FIG. 16 is a view illustrating a cross-section taken along line V-V' of FIG. 13.

Referring to FIGS. 1 to 4 and FIGS. 14 to 16, when a coil component 4000 according to this embodiment is compared to the coil component 1000 according to the first embodiment of the present disclosure, a noise removal portion 700 and an internal insulating layer 800 may be differently provided. Therefore, in describing this embodiment, only the noise removal portion 700 and the internal insulating layer 800, different from the first embodiment of the present disclosure, will be described. The remainder of the configuration of this embodiment may be applied as described in the first embodiment of the present disclosure.

Referring to FIGS. 14 to 16, a coil component 4000 according to this embodiment may further include a noise removal portion 700 and an internal insulating layer 800.

The noise removal portion 700 may be disposed in the body 100 to discharge noise transmitted to a component and/or noise generated from the component to a mounting substrate or the like. Specifically, the noise removal portion 700 may include a conductive loop pattern 710 disposed to be spaced apart from the coil portion 300 in the body 100 and having opposing end portions spaced apart from each other to form an open-loop, and a lead-out pattern 720 connected to the loop pattern 710 and the third external electrode 530. In this embodiment, the noise removal portion 700 may be disposed on the internal insulating layer 800, which will be described later, and may be disposed on the second coil pattern 312 (e.g., disposed to overlap with the second coil pattern 312 in the thickness Z direction). The noise removal portion 700 may be electrically insulated from and capacitively-coupled to the coil portion 300 by the internal insulating layer 800 and the insulating film IF.

The loop pattern 710 may have opposing end portions spaced apart from each other to form an open-loop. For example, the loop pattern 710 may be formed to have a ring shape, corresponding to a shape of the upper surface of the coil portion 300 as a whole, but a slit S may be formed in the loop pattern 710 to form an open-loop. The opposing end portions of the loop pattern 710 may be separated from each other by the slit S, and the loop pattern 710 may thus form an open-loop. In this case, "the loop pattern 710 may form an open-loop" may refer that, as illustrated in FIG. 14, the loop pattern 710 may have a shape of a plate-like loop as a whole in which a through-hole is formed in a central portion, but that one end portion and the other end portion of the loop pattern 710 may be completely spaced apart from each other, due to the slit S and the like, to form a structure that does not contact each other. Alternatively, "the loop pattern 710 may form an open-loop" may refer to a pattern that extends around a majority of a periphery of a central opening therein, but includes an interruption or slit there through such that the pattern does not extend around the full periphery of the central opening. As long as the loop pattern 710 satisfies a condition that the one end portion and the other end portion are spaced apart from each other to form an open-loop, as illustrated in FIGS. 14 and 15, inner and outer side surfaces thereof may be formed to have a ring shape, an oval ring shape as a whole, but are not limited thereto. As another example, the loop pattern 710 may be formed to have a ring shape in which the inner side surface is entirely circular and the outer side surface is entirely rectangular.

The loop pattern 710 may be disposed to correspond to (or overlap with in a thickness Z direction) a region in which the coil portion 300 is disposed. As an example, referring to FIGS. 14 to 16, a line width of a region of the loop pattern 710 projected in the Y direction onto the third surface 103 side of the body 100 may have a value similar to a distance between an innermost turn and an outermost turn of a region of the second coil pattern 312, projected in the Y direction onto the third surface 103 side. Since the loop pattern 710 is disposed in a region corresponding to (or overlapping with in the Z direction) the coil portion 300, reduction of the magnetic material in the body 100 may be minimized, while easily removing noise. Therefore, deterioration of characteristics of a component may be minimized, due to the reduction of magnetic material.

A position of the slit S in the loop pattern 710 may be modified. Specifically, referring to FIG. 15, a distance (d2) from one end portion of the loop pattern 710 to the third surface 103 of the body 100 may be equal to or greater than a distance (d1) from the other end portion of the loop pattern 710 to the fourth surface 104 of the body 100. In this case, the distance (d2) from the one end portion of the loop pattern 710 to the third surface 103 of the body 100 may refer to the shortest straight distance (d2) from a center of aside surface of the one end portion of the loop pattern 710 forming an inner wall of the slit S, in a line width direction of the loop pattern 710, to the third surface 103 of the body 100. In addition, the distance (d1) from the other end portion of the loop pattern 710 to the fourth surface 104 of the body 100 may refer to the shortest straight distance (d1) from a center of a side surface of the other end portion of the loop pattern 710 forming an inner wall of the slit S, in a line width direction of the loop pattern 710, to the fourth surface 104 of the body 100. In this case, since the slit S is formed in a region of the loop pattern 710, adjacent to the fourth surface 104 of the body 100, and the lead-out pattern 720 is exposed from the third surface 103 of the body 100, a path of high frequency noise transmitted through the loop pattern 710 to the lead-out pattern 720 may be minimized. For example, an effect of removing high frequency noise may be improved.

The lead-out pattern 720 may be exposed from the third surface 103 of the body 100. Since the lead-out pattern 720 is exposed from the third surface 103 of the body 100, the noise removal portion 700 may be in contact with and connected to the third external electrode 530.

The noise removal portion 700 may be formed of a conductive material such as copper (Cu), aluminum (Al), silver (Ag), tin (Sn), gold (Au), nickel (Ni), lead (Pb), titanium (Ti), or alloys thereof, but is not limited thereto. The noise removal portion 700 and the slit S may be formed by a method including at least one of an electroless plating method, an electroplating method, a vapor deposition method such as sputtering or the like, and an etching method, but are not limited thereto.

The internal insulating layer 800 may be disposed between the coil portion 300 and the noise removal portion 700. For example, as illustrated in FIG. 16, the internal insulating layer 800 may be disposed on the second coil pattern 312, and may be disposed between the second coil pattern 312 and the noise removal portion 700.

The internal insulating layer 800 may be formed by stacking insulating films on both surfaces of the support substrate 200 on which the coil portion 300 and the insulating film IF are formed. The insulating film may be a conventional non-photosensitive insulating film such as Ajinomoto Build-up Film (ABF) or prepreg, or a dry-film or a photosensitive insulating film such as PID. The internal insulating layer 800 may function as a dielectric layer, along with the insulating layer IF, since the coil portion 300 and the noise removal portion 500 may be capacitive-coupled to each other.

Although not described in this embodiment, modified examples described in the first embodiment of the present disclosure may be applied to the coil component 4000 according to this embodiment.

According to an embodiment of the present disclosure, high frequency noise may be easily removed.

While example embodiments have been illustrated and described above, it will be apparent to those skilled in the art that modified examples and modified examples could be made without departing from the scope of the present disclosure as defined by the appended claims.

What is claimed is:

1. A coil component comprising:

a body;

a coil portion disposed in the body, and having first and second lead-out portions exposed from at least one surface of the body to be spaced apart from each other;

first and second external electrodes disposed on the at least one surface of the body to be spaced apart from each other, and respectively connected to the first and second lead-out portions;

a dielectric layer disposed on a surface of the body and spaced apart from the first and second external electrodes; and a third external electrode disposed directly on the surface of the body having the dielectric layer disposed thereon to be spaced apart from each of the first and second external electrodes, and covering the dielectric layer.

2. The coil component according to claim 1, wherein the third external electrode is in contact with a surface of the body.

3. The coil component according to claim 1, wherein the coil portion further comprises a feed portion exposed from the surface having the dielectric layer disposed thereon of the body to be spaced apart from each of the first and second lead-out portions, wherein the dielectric layer is disposed on an exposed surface of the feed portion.

4. The coil component according to claim 3, wherein the feed portion includes a plurality of feed portions, each spaced apart from the first and second lead-out portions, and exposed from different surfaces of the body to be spaced apart from each other, and the dielectric layer and the third external electrode respectively include a plurality of dielectric layers and a plurality of third external electrodes disposed on exposed surfaces of the plurality of feed portions.

5. The coil component according to claim 4, wherein at least two of the plurality of third external electrodes are in contact with each other.

6. The coil component according to claim 4, wherein at least two of the plurality of third external electrodes are not in contact with each other.

7. The coil component according to claim 3, further comprising a conductor film disposed between the surface of the body having the dielectric layer disposed thereon and the dielectric layer and covering an exposed surface of the feed portion.

8. The coil component according to claim 7, wherein the dielectric layer covers the conductor film.

9. The coil component according to claim 7, wherein the feed portion includes a plurality of feed portions, each spaced apart from the first and second lead-out portions, and exposed from different surfaces of the body to be spaced apart from each other, and the conductor film, the dielectric layer, and the third external electrode respectively include a plurality of conductor films, a plurality of dielectric layers, and a plurality of third external electrodes disposed on exposed surfaces of the plurality of feed portions.

10. The coil component according to claim 1, wherein the dielectric layer comprises an insulating resin.

11. The coil component according to claim 1, wherein the body has one surface and another surface opposing each other, two end surfaces connecting the one surface and the other surface of the body and opposing each other, and two side surfaces connecting the end surfaces of the body and opposing each other, wherein the first and second external electrodes are disposed on respective end surfaces of the two end surfaces of the body and are respectively connected to the first and second lead-out portions exposed on the respective end surfaces of the two end surfaces of the body, and the dielectric layer and the third external electrode are disposed on one side surface of the two side surfaces of the body.

12. The coil component according to claim 1, further comprising a noise removal portion including a loop pattern having two end portions spaced apart from each other to form an open-loop, and a lead-out pattern connected to the loop pattern and the third external electrode, and disposed to be spaced apart from the coil portion in the body; and an internal insulating layer disposed between the coil portion and the noise removal portion.

13. The coil component according to claim 12, wherein the two end portions of the loop pattern are disposed to be spaced apart from each other by a slit.

14. The coil component according to claim 13, wherein the body has one surface and another surface opposing each other, two end surfaces connecting the one surface and the other surface of the body and opposing each other, and two side surfaces connecting the end surfaces of the body and opposing each other, wherein the lead-out pattern is exposed from one side surface among the two side surfaces of the body, and is connected to the third external electrode disposed on the one side surface of the body, and a distance from one end portion of the loop pattern to the one side surface of the body is equal to or greater than a distance from the other end portion of the loop pattern to the other side surface of the body.

15. The coil component according to claim 1, wherein the third external electrode is electrically isolated from the coil portion.

16. A coil component comprising:

a body;

a coil portion disposed in the body and including a coil having a plurality of turns disposed adjacent to each other on a plane;

first and second external electrodes disposed on at least one surface of the body and connected to opposite ends of the coil;

an insulating layer spaced apart from the first and second external electrodes, disposed on a surface of the body that intersects the plane, and having a composition different from the body; and a third external electrode disposed on the insulating layer, and directly on the body, so as to be free of overlap with the first and second external electrodes on surfaces of the body.

17. The coil component of claim 16, wherein the coil portion includes a feed portion extending from the outermost turn of the plurality of turns to the surface of the body having the insulating layer thereon, and the insulating layer overlaps the feed portion exposed to the surface of the body.

18. The coil component of claim 17, further comprising a conductor disposed on the surface of the body having the insulating layer thereon to be between the insulating layer and the surface of the body, and contacting the feed portion.

19. The coil component of claim 16, wherein the third external electrode contacts a surface of the body along at least one edge of the insulating layer.

20. The coil component of claim 16, wherein the insulating layer and third external electrode are disposed only on portions of the body that are free of the first and second external electrodes.

21. The coil component of claim 16, wherein the insulating layer comprises a dielectric and has a composition different from a composition of the body.

22. The coil component of claim 16, wherein the plane is orthogonal to a coil axis of the coil.

23. The coil component according to claim 16, wherein the third external electrode is electrically isolated from the coil portion.

24. A coil component comprising:

a body;

a coil portion including a coil disposed in the body;

first and second external electrodes disposed on at least one surface of the body;

a dielectric layer disposed on at least another surface of the body and spaced apart from the first and second external electrodes so as to be free of contact with the first and second external electrodes; and a third external electrode disposed on the dielectric layer, and directly on the body, and free of contact with the first and second external electrodes.

25. The coil component of claim 24, wherein the first and second external electrodes are disposed on respective opposing end surfaces of the body, and the dielectric layer includes at least one dielectric layer disposed on opposing side surfaces of the body.

26. The coil component of claim 24, wherein the dielectric layer and third external electrode are disposed only on portion of surfaces of the body that are free of the first and second external electrodes.

27. The coil component of claim 24, wherein the third external electrode contacts a surface of the body along at least one edge of the dielectric layer.

28. The coil component of claim 24, wherein the coil portion extends to a surface of the body having the dielectric layer disposed thereon.

29. The coil component according to claim 24, wherein the third external electrode is electrically isolated from the coil portion.

* * * * *